US010169909B2

(12) United States Patent
Angelidis et al.

(10) Patent No.: US 10,169,909 B2
(45) Date of Patent: Jan. 1, 2019

(54) GENERATING A VOLUMETRIC PROJECTION FOR AN OBJECT

(71) Applicant: Pixar, Emeryville, CA (US)

(72) Inventors: Alexis Angelidis, Albany, CA (US); Jacob Porter Merrell, El Sobrante, CA (US); Robert Moyer, Alameda, CA (US); Philip Child, Bristol (GB)

(73) Assignee: Pixar, Emeryville, CA (US)

( * ) Notice: Subject to any disclaimer, the term of this patent is extended or adjusted under 35 U.S.C. 154(b) by 207 days.

(21) Appl. No.: 14/622,791

(22) Filed: Feb. 13, 2015

(65) Prior Publication Data

US 2016/0042553 A1  Feb. 11, 2016

Related U.S. Application Data

(60) Provisional application No. 62/034,683, filed on Aug. 7, 2014.

(51) Int. Cl.
*G06T 15/06* (2011.01)
*G06T 15/50* (2011.01)

(52) U.S. Cl.
CPC ............ *G06T 15/06* (2013.01); *G06T 15/503* (2013.01)

(58) Field of Classification Search
CPC ....... G06T 15/10; G06T 15/06; G06T 15/503; G06T 15/30; G06T 15/50; G06T 15/60; G06T 15/80; G06T 15/00; G06T 15/04; G06T 15/08; G06T 13/00; G06T 13/60; G06T 13/40; G06T 13/80; G06T 15/506; G06T 15/55
See application file for complete search history.

(56) References Cited

U.S. PATENT DOCUMENTS

| 5,068,882 A | * | 11/1991 | Eberhard ............... A61B 6/032 378/11 |
| 5,257,183 A | * | 10/1993 | Tam ....................... G06T 11/005 378/4 |
| 5,422,986 A | * | 6/1995 | Neely ..................... G06T 15/60 345/426 |

(Continued)

OTHER PUBLICATIONS

Williams et al., Perceptually Guided Simplification of Lit, Textured Meshes, Apr. 2003, ACM.*

*Primary Examiner* — Devona Faulk
*Assistant Examiner* — Charles L Beard
(74) *Attorney, Agent, or Firm* — Baker Botts L.L.P.

(57) ABSTRACT

Particular embodiments comprise providing a surface mesh for an object, generating a voxel grid comprising volumetric masks for the mesh, and generating a lit mesh, wherein the lit mesh comprises a shaded version of the mesh as positioned in a scene. The voxel grid may be positioned over the lit mesh in the scene, and a first ray may be traced to a position of the voxel grid. If the traced ray passed through the voxel grid and hit a location on the lit mesh, then one or more second rays may be traced to the hit location on the lit mesh. If the traced ray hit a location in the voxel grid but did not hit a location on the lit mesh, then one or more second rays may be traced from the hit location in the voxel grid to the closest locations on the lit mesh. Finally, color sampled at one or more locations proximate to the position of the voxel grid may be blurred outward through the voxel grid to create a volumetric projection.

20 Claims, 6 Drawing Sheets

(56) References Cited

U.S. PATENT DOCUMENTS

| | | | | |
|---|---|---|---|---|
| 5,461,651 A * | 10/1995 | Tam | | G01N 23/04 378/19 |
| 5,570,460 A * | 10/1996 | Ramanujam | | G06T 17/20 345/424 |
| 5,583,975 A * | 12/1996 | Naka | | G06T 15/06 345/424 |
| 5,760,781 A * | 6/1998 | Kaufman | | G06T 1/20 345/424 |
| 5,909,476 A * | 6/1999 | Cheng | | G06T 11/006 378/4 |
| 6,028,910 A * | 2/2000 | Kirchner | | G01N 23/046 378/21 |
| 6,072,497 A * | 6/2000 | Lichtenbelt | | G06T 15/30 345/424 |
| 6,078,638 A * | 6/2000 | Sauer | | G01N 23/046 378/15 |
| 6,278,460 B1 * | 8/2001 | Myers | | G06T 7/0071 345/420 |
| 6,292,525 B1 * | 9/2001 | Tam | | G01N 23/046 378/15 |
| 6,324,245 B1 * | 11/2001 | Tam | | G06T 11/005 378/15 |
| 6,359,618 B1 * | 3/2002 | Heirich | | G06T 15/04 345/426 |
| 6,512,517 B1 * | 1/2003 | Knittel | | G06T 1/20 345/424 |
| 6,556,199 B1 * | 4/2003 | Fang | | G06T 15/08 345/424 |
| 6,664,961 B2 * | 12/2003 | Ray | | G06T 15/08 345/424 |
| 6,760,024 B1 * | 7/2004 | Lokovic | | G06T 15/06 345/421 |
| 6,857,746 B2 * | 2/2005 | Dyner | | G03B 21/608 239/18 |
| 6,906,724 B2 * | 6/2005 | Lake | | G06T 15/60 345/589 |
| 6,924,798 B2 * | 8/2005 | Marshall | | G06T 15/60 345/419 |
| 7,277,572 B2 * | 10/2007 | MacInnes | | G06F 17/5004 345/419 |
| 7,292,711 B2 * | 11/2007 | Kiraly | | G06T 7/0018 348/169 |
| 7,306,341 B2 * | 12/2007 | Chang | | G03B 37/04 353/11 |
| 7,327,365 B2 * | 2/2008 | Chen | | G06T 15/04 345/424 |
| 7,525,543 B2 * | 4/2009 | Engel | | G06T 15/08 345/419 |
| 7,609,264 B2 * | 10/2009 | Tong | | G06T 15/55 345/426 |
| 7,693,318 B1 * | 4/2010 | Stalling | | G06T 11/006 128/922 |
| 7,755,625 B2 * | 7/2010 | Kwon | | G06T 15/06 345/419 |
| 7,764,288 B2 * | 7/2010 | Anderson | | G06T 13/00 345/473 |
| 7,778,392 B1 * | 8/2010 | Berman | | A61B 6/032 378/210 |
| 7,901,093 B2 * | 3/2011 | Tan | | G03B 21/26 353/121 |
| 7,901,095 B2 * | 3/2011 | Xiao | | H04N 9/3147 345/644 |
| RE42,638 E * | 8/2011 | Ray | | 345/424 |
| 8,042,954 B2 * | 10/2011 | Tan | | H04N 9/3147 353/121 |
| 8,102,403 B1 * | 1/2012 | DeRose | | G06T 13/40 345/419 |
| 8,189,002 B1 * | 5/2012 | Westerhoff | | G06T 15/005 345/419 |
| 8,243,071 B2 * | 8/2012 | Wang | | G06T 15/50 345/426 |
| 8,379,955 B2 * | 2/2013 | McKenzie | | G06T 15/06 348/77 |
| 8,411,080 B1 * | 4/2013 | Zimmermann | | G06T 19/20 345/419 |
| 8,508,615 B2 * | 8/2013 | Tan | | H04N 9/3182 348/222.1 |
| 8,587,588 B2 * | 11/2013 | Smyth | | G06T 15/06 345/419 |
| 8,922,553 B1 * | 12/2014 | Tena | | G06T 17/00 345/419 |
| 9,007,372 B2 * | 4/2015 | Bakalash | | G06T 15/06 345/423 |
| 9,117,306 B2 * | 8/2015 | Bakalash | | G06T 15/06 |
| 9,142,056 B1 * | 9/2015 | Baran | | G06T 15/00 |
| 9,245,363 B2 * | 1/2016 | Laine | | G06T 11/40 |
| 9,245,377 B1 * | 1/2016 | Jarosz | | G06T 15/06 |
| 9,317,970 B2 * | 4/2016 | Beeler | | |
| 9,786,084 B1 * | 10/2017 | Bhat | | G06T 7/11 |
| 9,990,761 B1 * | 6/2018 | Anderson | | G06T 15/503 |
| 2002/0113787 A1 * | 8/2002 | Ray | | G06T 15/08 345/424 |
| 2002/0191814 A1 * | 12/2002 | Ellis | | G06F 19/3437 382/103 |
| 2003/0052875 A1 * | 3/2003 | Salomie | | G06T 17/20 345/419 |
| 2003/0071822 A1 * | 4/2003 | Lake | | G06T 15/60 345/589 |
| 2003/0112237 A1 * | 6/2003 | Corbetta | | G06T 15/60 345/426 |
| 2003/0214539 A1 * | 11/2003 | Iwema | | G06F 3/0481 715/861 |
| 2004/0021771 A1 * | 2/2004 | Stearns | | A61K 49/0013 348/131 |
| 2004/0125103 A1 * | 7/2004 | Kaufman | | G06T 15/06 345/419 |
| 2004/0150642 A1 * | 8/2004 | Borshukov | | G06T 13/80 345/426 |
| 2004/0169651 A1 * | 9/2004 | Everitt | | G06T 15/60 345/426 |
| 2004/0222987 A1 * | 11/2004 | Chang | | G01B 11/2509 345/419 |
| 2004/0263511 A1 * | 12/2004 | West | | G06T 15/40 345/421 |
| 2005/0017971 A1 * | 1/2005 | Ard | | G06T 15/40 345/423 |
| 2005/0041023 A1 * | 2/2005 | Green | | G06T 15/04 345/426 |
| 2005/0129296 A1 * | 6/2005 | Setala | | G06T 7/0046 382/131 |
| 2006/0028468 A1 * | 2/2006 | Chen | | G06T 15/04 345/424 |
| 2006/0104408 A1 * | 5/2006 | Thibault | | A61B 6/032 378/4 |
| 2006/0181551 A1 * | 8/2006 | Matsumoto | | G06T 15/08 345/679 |
| 2006/0210147 A1 * | 9/2006 | Sakaguchi | | G01C 11/06 382/154 |
| 2006/0238534 A1 * | 10/2006 | Matsumoto | | G06T 15/08 345/420 |
| 2006/0274065 A1 * | 12/2006 | Buyanovskiy | | G06T 15/06 345/419 |
| 2006/0274070 A1 * | 12/2006 | Herman | | A63F 13/10 345/474 |
| 2007/0040830 A1 * | 2/2007 | Papageorgiou | | G06T 15/08 345/424 |
| 2007/0040833 A1 * | 2/2007 | Buyanovski | | G06T 15/06 345/426 |
| 2007/0098299 A1 * | 5/2007 | Matsumoto | | G06T 15/08 382/284 |
| 2007/0229502 A1 * | 10/2007 | Tong | | G06T 15/55 345/426 |
| 2007/0245119 A1 * | 10/2007 | Hoppe | | G06F 17/30262 711/216 |
| 2008/0033277 A1 * | 2/2008 | Yang | | G06T 15/06 600/407 |

(56) References Cited

U.S. PATENT DOCUMENTS

| | | | |
|---|---|---|---|
| 2008/0118143 A1* | 5/2008 | Gordon | G01B 11/2513 382/154 |
| 2008/0180440 A1* | 7/2008 | Stich | G06T 15/40 345/426 |
| 2008/0246766 A1* | 10/2008 | Yokohari | G06T 17/20 345/423 |
| 2008/0259080 A1* | 10/2008 | Masumoto | G06T 15/08 345/426 |
| 2008/0278490 A1* | 11/2008 | Dekel | G06T 15/08 345/424 |
| 2008/0309667 A1* | 12/2008 | Zhou | G06T 15/506 345/426 |
| 2008/0317321 A1* | 12/2008 | Zhang | G06T 15/08 382/132 |
| 2009/0021513 A1* | 1/2009 | Joshi | G06T 15/005 345/419 |
| 2009/0033661 A1* | 2/2009 | Miller | G06T 15/60 345/426 |
| 2009/0034874 A1* | 2/2009 | Miller | G06T 15/50 382/279 |
| 2009/0073324 A1* | 3/2009 | Tan | H04N 5/2628 348/745 |
| 2009/0167763 A1* | 7/2009 | Waechter | G06T 15/06 345/426 |
| 2009/0219287 A1* | 9/2009 | Wang | G06T 15/50 345/426 |
| 2009/0243916 A1* | 10/2009 | Beeri | G01S 7/20 342/179 |
| 2009/0284529 A1* | 11/2009 | De Aguiar | G06T 13/40 345/420 |
| 2010/0053209 A1* | 3/2010 | Rauch | A61B 6/4441 345/619 |
| 2010/0074532 A1* | 3/2010 | Gordon | G01B 11/25 382/203 |
| 2010/0088034 A1* | 4/2010 | Hill | G01V 1/282 702/14 |
| 2010/0111370 A1* | 5/2010 | Black | G06K 9/00369 382/111 |
| 2010/0123784 A1* | 5/2010 | Ding | H04N 17/04 348/189 |
| 2010/0128038 A1* | 5/2010 | Hoffman | G06T 15/506 345/426 |
| 2010/0141780 A1* | 6/2010 | Tan | H04N 9/3182 348/222.1 |
| 2010/0149073 A1* | 6/2010 | Chaum | G02B 27/0093 345/8 |
| 2010/0188403 A1* | 7/2010 | Mejdrich | G06T 17/005 345/426 |
| 2010/0265250 A1* | 10/2010 | Koenig | G06T 13/00 345/419 |
| 2010/0295851 A1* | 11/2010 | Diamand | G06T 15/405 345/422 |
| 2010/0302245 A1* | 12/2010 | Best | G06T 15/06 345/426 |
| 2010/0321478 A1* | 12/2010 | Sliwa | G02B 27/2271 348/51 |
| 2011/0002020 A1* | 1/2011 | Khan | G03H 1/2286 359/22 |
| 2011/0043521 A1* | 2/2011 | Smyth | G06T 15/06 345/424 |
| 2011/0103658 A1* | 5/2011 | Davis | G01N 21/4795 382/128 |
| 2011/0142201 A1* | 6/2011 | Eberhard | G01V 5/0008 378/57 |
| 2011/0234583 A1* | 9/2011 | Bakalash | G06T 15/06 345/419 |
| 2011/0235885 A1* | 9/2011 | Rauch | A61B 6/4441 382/131 |
| 2011/0254839 A1* | 10/2011 | Hammer | G06T 17/00 345/420 |
| 2011/0254845 A1* | 10/2011 | Oikawa | G06T 7/12 345/427 |
| 2011/0285710 A1* | 11/2011 | Mejdrich | G06T 15/06 345/426 |
| 2012/0019517 A1* | 1/2012 | Corazza | G06T 13/40 345/419 |
| 2012/0053464 A1* | 3/2012 | Murashita | G06T 3/403 600/443 |
| 2012/0098941 A1* | 4/2012 | Joseph | G02B 27/2221 348/51 |
| 2012/0155731 A1* | 6/2012 | Weersink | A61N 5/103 382/131 |
| 2012/0162372 A1* | 6/2012 | Ghyme | H04N 13/004 348/46 |
| 2012/0280978 A1* | 11/2012 | Holub | A61B 5/0044 345/419 |
| 2013/0024545 A1* | 1/2013 | Sheppard | G06T 9/001 709/217 |
| 2013/0063436 A1* | 3/2013 | Li | G06T 15/08 345/423 |
| 2013/0135288 A1* | 5/2013 | King | G06F 3/04812 345/419 |
| 2013/0135308 A1* | 5/2013 | Kho | G06T 15/08 345/424 |
| 2013/0229411 A1* | 9/2013 | Choi | G06T 15/04 345/419 |
| 2013/0257853 A1* | 10/2013 | Schmidt | G06T 17/20 345/419 |
| 2013/0301908 A1* | 11/2013 | Shim | G06T 5/005 382/154 |
| 2013/0321418 A1* | 12/2013 | Kirk | G06T 15/04 345/423 |
| 2014/0015834 A1* | 1/2014 | Kho | G06T 11/001 345/426 |
| 2014/0146198 A1* | 5/2014 | Omori | H04N 1/6027 348/222.1 |
| 2014/0168217 A1* | 6/2014 | Kim | G06T 13/40 345/420 |
| 2014/0176535 A1* | 6/2014 | Krig | G06T 15/04 345/419 |
| 2014/0176574 A1* | 6/2014 | Bakalash | G06F 12/0875 345/505 |
| 2014/0185741 A1* | 7/2014 | Shen | G01V 5/005 378/5 |
| 2014/0198103 A1* | 7/2014 | Johansson | G06T 17/00 345/420 |
| 2014/0212018 A1* | 7/2014 | Hein | G06T 11/008 382/132 |
| 2014/0218364 A1* | 8/2014 | Collins | G06T 15/60 345/426 |
| 2014/0247264 A1* | 9/2014 | Sundberg | G06T 11/006 345/424 |
| 2014/0324204 A1* | 10/2014 | Vidimce | B29C 67/0088 700/98 |
| 2014/0330121 A1* | 11/2014 | Kim | A61B 8/485 600/438 |
| 2014/0333623 A1* | 11/2014 | Ozdas | G06T 15/08 345/426 |
| 2014/0375641 A1* | 12/2014 | Bakalash | G06T 15/06 345/426 |
| 2015/0029185 A1* | 1/2015 | Ikits | G06T 15/08 345/420 |
| 2015/0124086 A1* | 5/2015 | Melle | G01B 11/002 348/136 |
| 2015/0187119 A1* | 7/2015 | Masumoto | A61B 6/466 345/424 |
| 2015/0228110 A1* | 8/2015 | Hecht | G06T 15/08 345/419 |
| 2015/0287229 A1* | 10/2015 | Sela | G06T 13/40 345/419 |
| 2015/0317825 A1* | 11/2015 | Hazel | G06T 15/60 345/426 |
| 2015/0371393 A1* | 12/2015 | Ramachandra | G06T 7/0055 382/154 |
| 2016/0005213 A1* | 1/2016 | Lecocq | G06T 15/60 345/419 |
| 2016/0015350 A1* | 1/2016 | Chang | A61B 6/5258 250/362 |

(56) References Cited

U.S. PATENT DOCUMENTS

| | | | |
|---|---|---|---|
| 2016/0042552 A1* | 2/2016 | McNabb | G06T 15/005 345/424 |
| 2016/0078663 A1* | 3/2016 | Sareen | G06T 19/00 345/419 |
| 2016/0093084 A1* | 3/2016 | Sumner | G06T 13/40 345/473 |
| 2016/0125642 A1* | 5/2016 | Zhu | G06T 15/60 345/421 |
| 2016/0163048 A1* | 6/2016 | Yee | G06F 3/016 382/131 |
| 2016/0203635 A1* | 7/2016 | Wyman | G06T 15/60 345/426 |
| 2016/0240001 A1* | 8/2016 | Sheffer | G06T 17/20 |
| 2016/0260245 A1* | 9/2016 | DeCell | G06T 15/60 |
| 2016/0267705 A1* | 9/2016 | O'Leary | G06F 3/04815 |
| 2016/0292902 A1* | 10/2016 | Milne | G06T 9/40 |
| 2016/0321838 A1* | 11/2016 | Barone | H04N 1/00827 |
| 2017/0011546 A1* | 1/2017 | Zatonyi | G06T 15/87 |
| 2017/0323471 A1* | 11/2017 | Chien | G06T 11/001 |
| 2018/0005428 A1* | 1/2018 | Montero | G06T 13/40 |
| 2018/0047208 A1* | 2/2018 | Marin | G06T 11/001 |
| 2018/0174355 A1* | 6/2018 | Day | G06T 15/08 |

* cited by examiner

GENERATING A VOLUMETRIC PROJECTION FOR AN OBJECT

PRIORITY

This application claims the benefit, under 35 U.S.C. § 119(e), of U.S. Provisional Patent Application No. 62/034,683, filed 7 Aug. 2014, which is incorporated herein by reference.

TECHNICAL FIELD

This disclosure generally relates to three-dimensional ("3D") computer graphics.

BACKGROUND

Pixar is well known for producing award-winning three-dimensional ("3D") computer-animated films, such as "Toy Story" (1995), "Monsters, Inc." (2001), "Finding Nemo" (2003), "The Incredibles" (2004), "Ratatouille" (2007), "WALL-E" (2008), "Up" (2009), and "Brave" (2012). In order to produce films such as these, Pixar developed its own platform for network-distributed rendering of complex 3D graphics, including ray-traced 3D views. The RenderMan® platform includes the RenderMan® Interface Specification (an API to establish an interface between modeling programs, e.g., AUTODESK MAYA, and rendering programs in order to describe 3D scenes), RenderMan® Shading Language (a language to define various types of shaders: surface, light, volume, imager, and displacement), and PhotoRealistic RenderMan® (a rendering software system).

Many computer graphic images are created by mathematically modeling the interaction of light with various objects (e.g., a character) a 3D scene from a given viewpoint. Each 3D object in the scene may be represented by a 3D model of its surface geometry, for example, a shell model (e.g., polygon mesh, non-uniform rational B-spline (NURBS) curves, or subdivision surface, such as a Catmull-Clark subdivision mesh).

By utilizing various shaders (shading and lighting programs), the scene may be illuminated by one or more light sources in the scene to determine the final color information at each location in the scene. By This process, called rendering, uses a rendering system to generate a two-dimensional image (2D) of the scene from the given viewpoint, and is analogous to taking a photograph of a real-world scene. Animated sequences can be created by rendering a sequence of images of a scene as the scene changes over time.

Surface attribute functions can define the values of attributes of surfaces in three-dimensional space. Surface attribute functions can be evaluated at any point on the surface to provide corresponding attribute values at that point on the surface. Attributes of surfaces can include optical properties of a surface, such as color, transparency, reflectivity, and refractivity. Attributes can also include visibility or occlusion information; artistically or procedurally generated texture data in one, two, three, or more dimensions; shadow generation information; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs.

An application such as a rendering or animation application determines pixel values in an image by evaluating or sampling a surface and its associated surface attribute functions. Surfaces can include triangles and polygons; higher-order surfaces such as B-splines; subdivision surfaces; and implicit surfaces, among others.

Many rendering effects are performed by sampling a 3D scene at discrete points. The rendering system determines one or more attribute values, such as color, transparency, or depth, for the sample of the 3D scene. The attribute values of one or more samples of the 3D scene are then combined to determine the value of a pixel of the rendered image. For example, a rendering system may trace sample rays into a 3D scene (or project geometry onto an image plane) to render geometry. The intersection of a sampling ray and geometry (or an image sample point in the image plane and the projected geometry) defines a sample of the 3D scene used to determine the value of a pixel of the rendered image. Additionally, illumination, shadowing, scattering, depth of field, motion blur, reflection, and refraction effects are created by casting additional sample rays from an intersected portion of scene geometry into further portions of the 3D scene.

As part of the determination of a color attribute of a point (or points) on a surface, each light source in a set typically is evaluated to determine whether that light source contributes to the computed color value of that point. This determination entails identifying whether the light emitted from each light source is transmitted to the given point on the surface, whether the light is blocked by some other element of the object scene, and/or whether the light falls off (loses all intensity or ability to light an object) before reaching the surface. It further is possible that the light source is outside the frame or shot (multiple contiguous frames) of animation, or outside the view of a virtual camera viewing the set and determining the bounds of the frame(s), but still illuminates at least one surface in the frame or shot. Even further still, a light outside a frame might cast a shadow on an object or surface in the frame.

Conventional techniques of generating special effects for an animated character have been achieved using a manual and iterative process of compositing 2D images to combine visual elements from different sources into a single image. When used to achieve certain special effects, such as a soft, glow-like effect, such techniques may require such time-consuming and labor-intensive effort on the part of the artist/animator (particularly when dealing with 3D graphics) that oftentimes, a dedicated person may be hired as a compositer.

SUMMARY

Particular embodiments may utilize a rendering system, e.g., the RenderMan® platform, to generate a volumetric projection (e.g., a volumetric soft edge) for an object (e.g., a character) in a scene. In particular embodiments, a soft, glow-like effect may appear to emanate from a region or edge of the object for which a volumetric projection is generated. The volumetric projection may be generated by blurring the color from a specified location on a surface geometry for the object outward through a voxel grid overlaying the surface geometry. Two operations may be performed concurrently or serially on the surface geometry in order to generate the volumetric projection: (1) one or more lighting operations may be performed on the object in the scene, wherein the lit mesh for the object is ultimately rendered as invisible (but the color information at each location on the object's surface geometry—as lit in the scene—is preserved), and (2) a voxel grid may be generated for the object, wherein the depth of the voxel grid over any particular point of the lit mesh and/or beyond the perimeter of the lit mesh may vary. In some embodiments, the voxel grid may be overlaid on top of the lit mesh in the scene. In particular embodiments, the voxel grid may be culled from those areas for which a volumetric projection is not desired (e.g., if only the character's skin—and not their clothing, hair, or facial features—needs to have the glow-like effect). A first set of rays may then be traced from a viewpoint (e.g., the location of a virtual camera or a viewer's eye) toward the object (and through the voxel grid at each location on the lit mesh). For each ray in the first set of rays that hits a location in the mesh, colors sampled at that location may be blurred from that location in the mesh outward through the voxel grid. Once determination of the color information for the voxel grid has been completed, the voxel grid and the invisible lit mesh may be incorporated back into the overall 3D scene, and the objects in the scene for the frame may continue through the graphics pipeline until they are rasterized into a 2D image for the frame.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

Description Of Example Embodiments

Figure 1A:
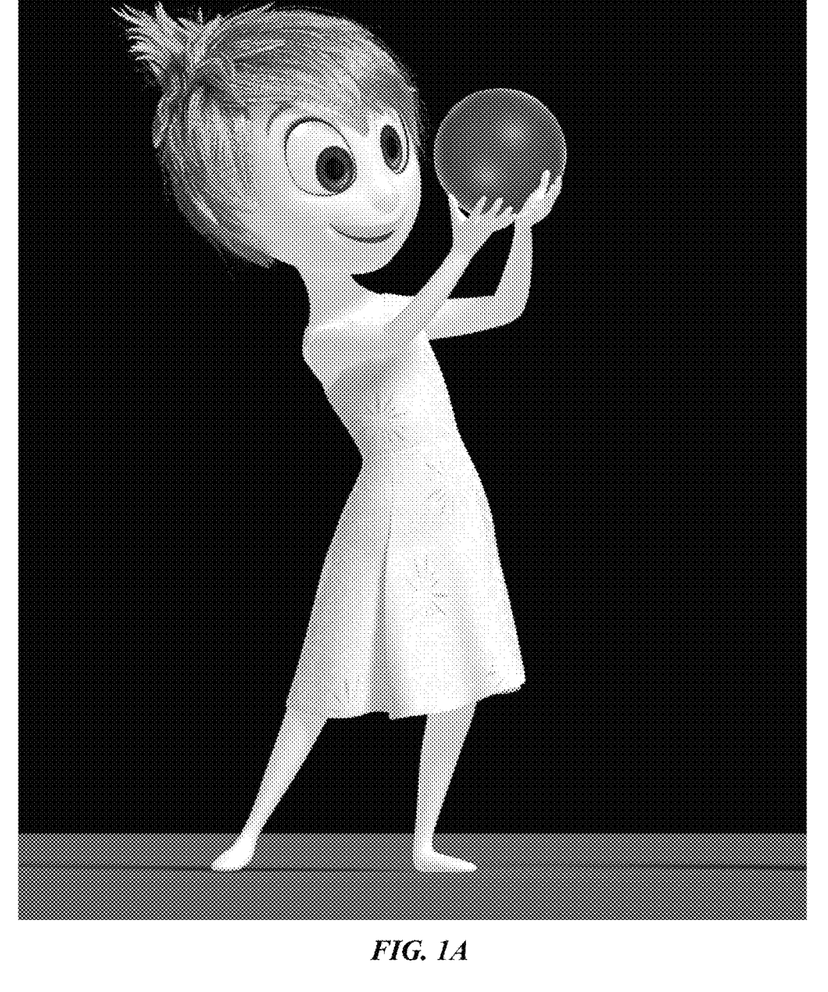
FIGS. 1A and 1B illustrate an example application of techniques described herein to an example character.
Figure 1B:
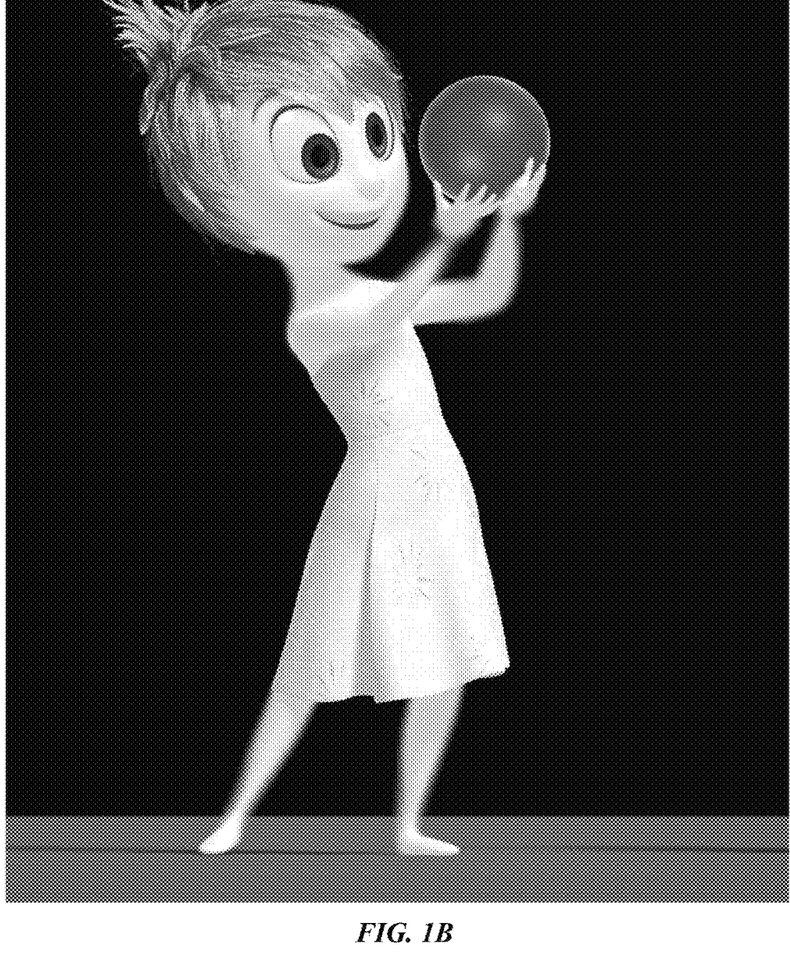

Particular embodiments may utilize a rendering system, e.g., the RenderMan® platform, to generate a volumetric projection (e.g., a volumetric soft edge) for an object (e.g., a character) in a scene. In particular embodiments, a soft, glow-like effect may appear to emanate from a region or edge of the object for which a volumetric projection is generated. The volumetric projection may be generated by blurring the color from a specified location on a surface geometry for the object outward through a voxel grid overlaid on the surface geometry. FIGS. 1A and 1B illustrate an example application of techniques described herein.

FIG. 1A illustrates an example rendering of a lit mesh for a character. The surface geometry (e.g., a mesh) for the character has been lit in scene, with a single light source generally located in the upper-right hand corner of the frame. As shown in FIG. 1A, the character is sharply rendered and all of the character's limbs are clearly defined. Lighting and shading of different areas of the character and the resulting effect on the appearance of the character is apparent (e.g., since the neck is in shadow, the character's skin appears darker there than on the character's nose).

FIG. 1B illustrates an example rendering of the character shown in FIG. 1A after generating a volumetric projection for the character. As shown in FIG. 1B, soft, glow-like effects appear to emanate from the character's limbs, neck, and jawline. These volumetric projections were generated by blurring the color from specified locations on the lit mesh for the character outward through a voxel grid overlaid on the surface geometry. The voxel grid represents a 3D mask structure covering and corresponding to the surface geometry of the character (as represented by the lit mesh)—the depth of the voxel grid over any particular location of the lit mesh positively correlates to the magnitude of color blurring (which corresponds to the degree of the glow-like effect) at that particular location. As shown in FIG. 1B, the voxel grid was heavily culled in the areas of the character's hair, eyes, mouth, and dress, in order to show those features in sharp definition without any glow effect.

Figure 2:
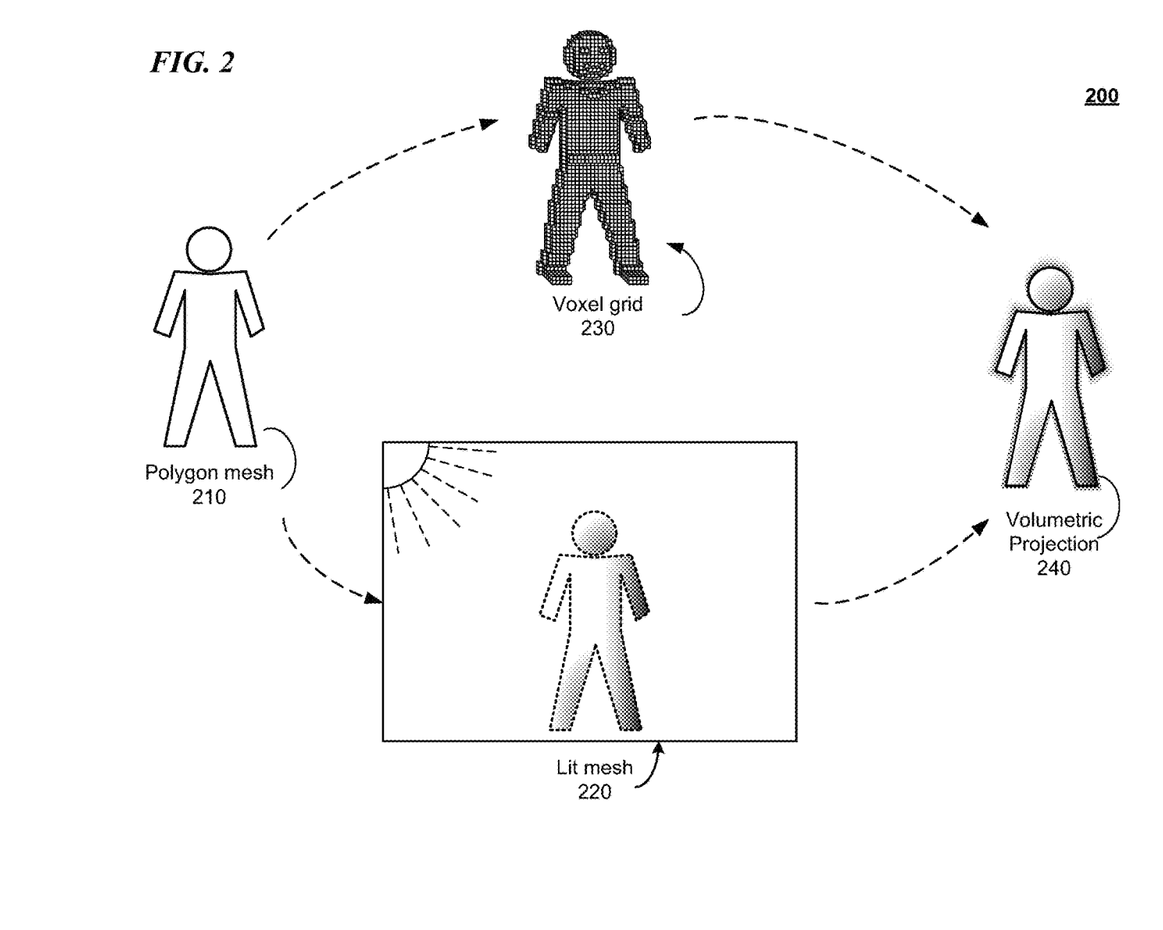
FIG. 2 illustrates a workflow for generating a volumetric projection for an object.

FIG. 2 illustrates a workflow 200 for generating a volumetric projection (e.g., a volumetric soft edge) for an object (e.g., a character) in a scene of an animated content item (e.g., an animated feature film). Surface geometry 210 for the object may be represented by a polygon mesh, a subdivision mesh, or any other technique of defining a 3D model for the object. In order to expedite the process, particular embodiments enable concurrent execution of operations to (1) light the object in scene and produce an invisible lit mesh 220, and (2) generate voxel grid 230 for the object. Once both voxel grid 230 and lit mesh 220 have been separately generated, voxel grid 230 is placed into the scene (overlaying lit mesh 220) in order to generate volumetric projection 240.

In particular embodiments, lit mesh 220 is rendered as invisible, but the color information at each location on the object's surface geometry—as lit in the scene—is preserved at each surface point on the mesh. The color information may then be utilized as a basis for determining color for the voxel grid 230 (which, as initially generated, may not include any color information). As discussed in further detail below, ray tracing techniques may be utilized to determine colors at different locations in the voxel grid by sampling colors at proximate locations in lit mesh 220.

In particular embodiments, voxel grid 230 may be specified (e.g., as part of the object model) as a combination of multiple volumetric masks, such as, for example, a "tight" inner volumetric mask (forming a thin volumetric layer over lit mesh 220 to produce little or no blur), and in particular areas of lit mesh 220, one or more "soft" outer volumetric masks (e.g., to form thicker regions of the voxel grid over the lit mesh to produce increased color blurring). In particular embodiments, voxel grid 230 may be specified as a signed distance field (storing values for the distance of each voxel in voxel grid 230 from the original mesh). Regions of the voxel grid 230 may be culled in particular areas in order to reduce blur in those areas for which clear definition is desired (e.g., eyes, hair, mouth).

Once the voxel grid 230 has been overlaid on lit mesh 220 in scene, particular embodiments may generate volumetric projection 240. Volumetric projection 240 represents the result of performing ray tracing from the viewpoint through the voxel grid to the mesh, in order to sample colors from locations in the mesh, which are blurred outwards from the mesh through the voxel grid in order to produce a volumetric soft edge.

Figure 3:
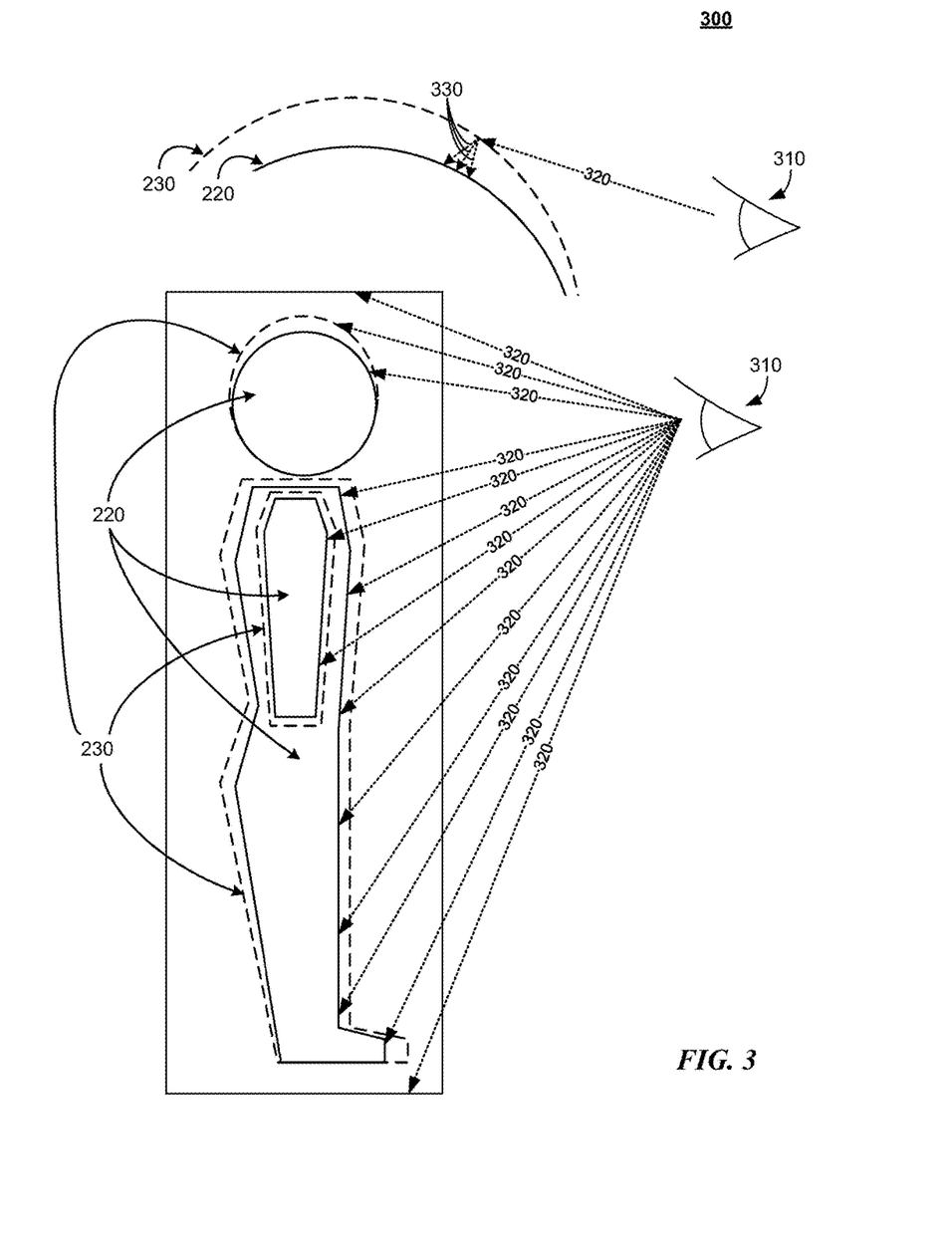
FIG. 3 illustrates an example of ray tracing to generate a volumetric projection for an object.

FIG. 3 illustrates an example of performing ray tracing to generate a volumetric projection for an object. From a viewpoint 310 (e.g., the location of a virtual camera or a viewer's eye), rays 320 may be traced toward the surface of the object (as represented by lit mesh 220). Some or all of the rays 320 may pass through the voxel grid 230 (those that miss the voxel grid will miss lit mesh 220 as well, e.g., the top ray 320 and the bottom ray 320). For each ray in the set of rays 320 that hits (e.g., makes contact with) a location on the surface of the object, the color at that location on the surface is sampled and blurred from that location on the surface of the object outward through the voxel grid in a graduated manner. In particular embodiments, when a ray is deemed to have hit the lit mesh in a particular location, the location may be defined as a single point on the surface of the object, a single polygonal face in the surface of the object, an area of the surface of the object that covers a plurality of points, or an area of the surface of the object that covers a plurality of polygonal faces. Where the defined location covers a plurality of points in the lit mesh, the sampled colors at the various points in the lit mesh within the defined location may be combined using any color blending technique, and the combined color may be used for the color blurring.

In one example, the blurring of the sampled color may be determined by applying a gradient between the sampled color at the location on the surface of the object and the color in the scene just beyond the outer boundary of the voxel grid, where the gradient extends from the surface of the object to the outer boundary of the voxel grid. In particular embodiments, the direction of blurring through the voxel grid may be toward the viewpoint; in particular embodiments, the direction of blurring through the voxel grid may radiate orthogonally away from a perimeter of the lit mesh. Once determination of the color information for the object in the scene has been completed for every location in the voxel grid corresponding to a location on the surface of the object that was hit by a traced ray, the color information may be incorporated back into the overall 3D scene, and the final 2D image for each frame may be rasterized using any rasterization technique.

In particular embodiments, two sets of rays 320 may be traced from viewpoint 310 towards the surface of the object. The first set of rays 320 may simply be utilized to determine which rays hit the surface of the object and which did not, and the second set of rays 320 may be utilized to perform the actual color sampling. For each ray in the first set of rays 320 that hit the surface of the object, a second ray 320 may be fired (along the same differential: from viewpoint 310 to the same location on lit mesh 220) in order to sample color at the location at which the ray hit the mesh.

In a few cases, certain rays 320 may miss the surface of the object but hit and pass through at least one voxel in voxel grid 230 (e.g., as shown in the exploded view section of FIG. 3, ray 320 passes above the surface of the head of the character, therefore missing lit mesh 220, but still hits at least one voxel location in voxel grid 230). In order to ensure that the volumetric projection is not deficient in such regions, particular embodiments may determine the location(s) of one or more of the closest (with respect to the hit voxel) corresponding point(s) in lit mesh 220 that registered a hit, and one or more second rays 330 may be traced from the voxel location to the corresponding location(s) in lit mesh 220 in order to sample color at the location(s). After color values have been obtained from the corresponding location, color may be blurred from the corresponding location(s) in the mesh outward through the voxel grid in the direction of the voxel that registered the "miss," thereby enabling volumetric projection beyond the perimeter of lit mesh 220 and producing a "halo effect." Particular embodiments may trace multiple rays from the voxel location to the corresponding location in lit mesh 220 and then combine colors from the multiple rays in order to achieve a higher-quality blur.

In some situations, when a region of the object for which a volumetric projection is desired overlays (with respect to the viewpoint) a region of the object for which a volumetric projection is not desired, a ray may hit lit mesh 220 in a location from which color sampling is undesirable. For example, a character may be clothed in a navy short-sleeved shirt and jeans with the character's bare forearm bent and folded across the torso (which is covered by the shirt). In this case, rays traced towards the boundaries of the voxel grid surrounding the bare forearm may pass through the voxel grid without hitting the region of the lit mesh that includes the bare forearm. If the desired effect is to generate a volumetric projection of any areas of exposed skin, it may be possible that a ray hits lit mesh 220 just above the arm (at a location on the navy shirt). Since it is not desirable that color is sampled in that area (which may result in blurring the navy color of the shirt into the arm area and/or result in a blurry outline for the shirt), in particular embodiments, a maximum distance (from the viewpoint) may be established for rays directed at regions of lit mesh 220 that should not be sampled (so that the ray falls short of hitting the lit mesh). For example, the maximum distance for rays being traced towards that particular location may be established based on information provided by the 3D model for the object indicating which regions of the object (e.g., the surface of the character's shirt) should not be included when sampling colors for a volumetric projection. Using this technique, one may restrict rays from being traced through the voxel grid for the forearm to hit the lit mesh at a location where only colors for the shirt may be sampled. By establishing a maximum distance that the ray may be traced, the ray falls short of the lit mesh (e.g., a miss), and particular embodiments execute the steps described above to determine the location of the closest (with respect to the voxel) corresponding location in lit mesh 220 that registered a hit (most likely the closest location on the character's arm). One or more second rays 230 may be traced from the voxel location to the corresponding location(s) in lit mesh 220 in order to sample color at the corresponding location(s). The sampled color is then blurred from the mesh through the voxel grid in the direction of the voxel that registered the "miss." As described above, articular embodiments may trace multiple rays from the voxel location to the corresponding location in lit mesh 220 and then combine colors (e.g., by simply averaging RGB color values, or by utilizing an appropriate color blending mode, such as soft light mode) from the multiple rays in order to achieve a higher-quality blur.

In particular embodiments, color sampling may be performed according to a sampling pattern. The sampling pattern may specify whether the color to be blurred into the voxel grid should be sampled in a coarse-grained manner (e.g., sampling color from a large cluster of points in the mesh) or fine-grained (e.g., based on a single point in the mesh or a small cluster of points in the mesh) manner. In either case, if the sampling pattern indicates that color should be sampled from more than one point in the mesh, the sampled colors are combined to obtain a single color for volumetric projection from the sampled locations outwards through the mesh. Once color values are obtained for a location in the mesh, colors sampled at that location may be combined, and the combined volumetric projection color may be blurred from that location in the mesh outward through the voxel grid. For example, as shown with respect to the character in FIG. 1B, the sampling pattern generally includes the character's feet, legs, arms, hands, neck, and jawline. The sampling pattern is weighted very differently as compared between the character's wrists and the character's fingers. Since the sampling pattern in the area of the character's wrists indicated coarse-grained color sampling, the character's wrists have almost disappeared due to the effect of combining the color of the character's wrists with the dark background color. The sampling pattern in the area of the character's fingers, however, indicated a finer-grained color sampling, and so although the character's fingers appear slightly blurred, they are still relatively clearly defined. In some embodiments, the sampling pattern may be configured by an artist (e.g., in a modeling program) or generated automatically (e.g., based on the outline of the character with respect to the viewpoint—for example, by applying fine-grained color sampling in areas of the character with finer details, such as fingers, and coarse-grained color sampling in other areas).

Figure 4:
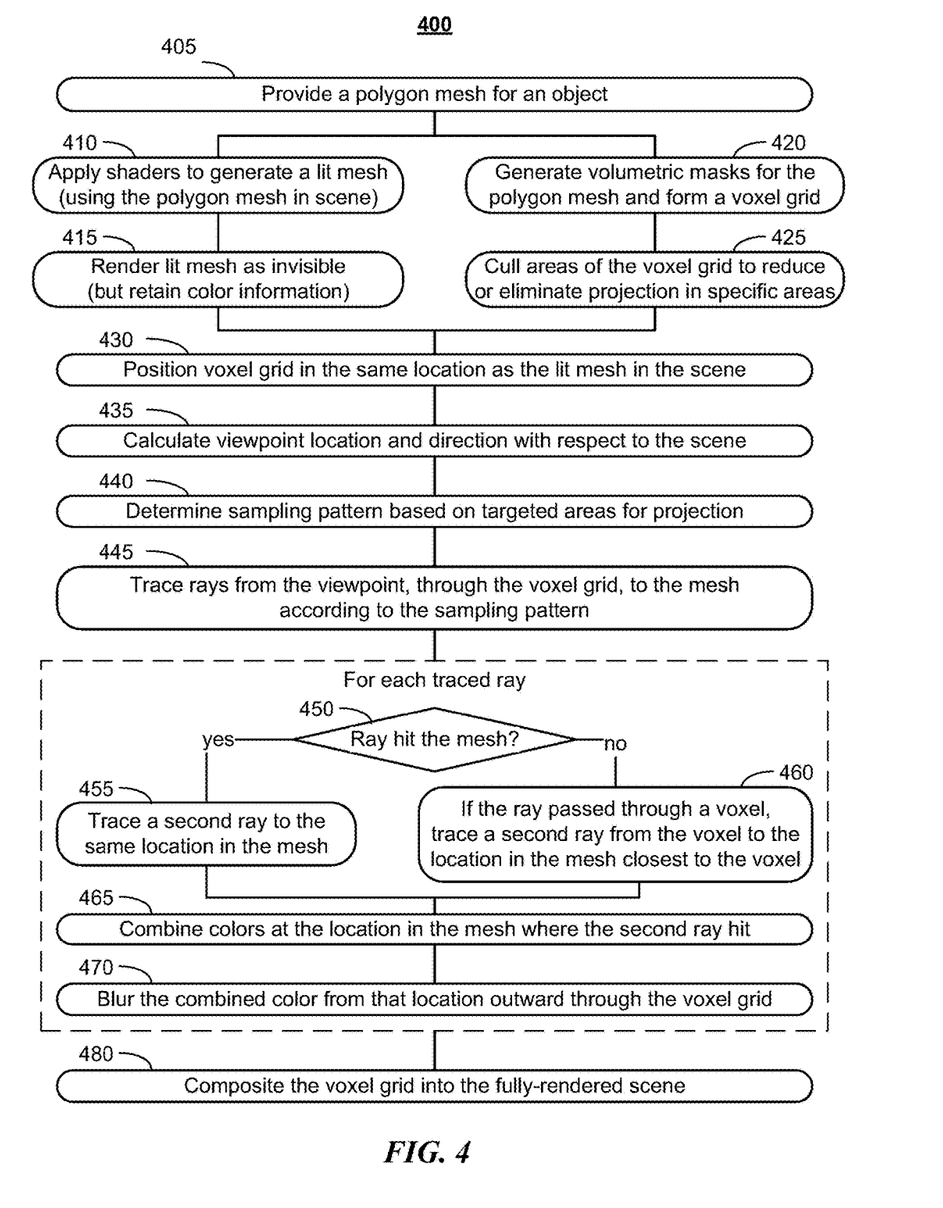
FIG. 4 illustrates an example method for generating a volumetric projection for an object.

FIG. 4 illustrates an example method for generating a volumetric projection for an object. In step 405, particular embodiments provide surface geometry (e.g., mesh 210) for an object. Any conventional type of surface geometry may be utilized. In steps 410 and 415, as discussed above, the lit mesh is generated—in step 410, any conventional technique may be used (e.g., applying shaders using RenderMan® shading language) to generate the lit mesh, and then in step 415, the lit mesh may be rendered as invisible (so that the outline of the lit mesh is not visible through the voxel grid).

In particular embodiments, steps 420 and 425 may be executed concurrently with steps 410 and 415 in order speed up the overall process. In step 420, particular embodiments may generate the volumetric masks for the mesh by first generating a bounding box to define the perimeter of the voxel grid around the mesh (e.g., as a signed distance field). In particular embodiments, the dimensions of the bounding box may be specified by the 3D model for the object, as the minimum enclosing space for the voxel grid given the dimensions of the character and the maximum depth of the volumetric masks. For each voxel within the voxel grid, particular embodiments may: (1) calculate the voxel's distance to the mesh, (2) calculate the solid angle subtended by the voxel at the viewpoint (e.g., by determining the area of the projection of the voxel onto a unit sphere centered at the viewpoint), and (3) determine the density or opacity of the voxel (e.g., based on the location of the voxel with respect to the voxel grid and the depth of the voxel grid at the location of the voxel). In step 425, certain areas of the voxel grid may be culled to reduce or eliminate volumetric projection. Selection of any such areas may be determined by any applicable method, such as, for example, by designation of clothed areas of a body as areas in which to eliminate volumetric projection, or by designation of certain facial features (e.g., eyes, hair, mouth) as areas in which to reduce or entirely eliminate volumetric projection, or by designation of certain frames in which to alter the volumetric projection with respect to prior frames.

In step 430, the voxel grid may be positioned in scene in the same location as the lit mesh. In particular embodiments, the voxel grid may not fully extend across the lit mesh—in such embodiments, the voxel grid may be superimposed over those areas of the lit mesh corresponding to the voxel grid. In step 435, particular embodiments calculate viewpoint (e.g., camera) location and direction with respect to the scene.

In step 440, particular embodiments determine a sampling pattern based on targeted areas for volumetric projection. The sampling pattern may indicate whether color should be sampled in a coarse- or fine-grained manner. For example, fine-grained color sampling may result in color being sampled from a smaller region of the lit mesh (e.g., encompassing just a couple of polygonal faces), whereas coarse-grained color sampling may result in color being sampled from a larger region of the lit mesh.

In step 445, particular embodiments trace an initial set of rays through the voxel grid to the lit mesh according to the sampling pattern. Any conventional technique for ray-tracing may be applied. For each ray in this initial set of rays, particular embodiments assess whether the initial ray hit or missed the lit mesh (step 450).

If the initial ray hit the mesh in an intended target region, in step 455, a second ray 320 is traced to the same location in the mesh, and color(s) are sampled at that location. In particular embodiments, in the situation where the initial ray would otherwise hit the mesh in a region from which color should not be sampled, a maximum distance may be set so that the initial ray falls short of the lit mesh and is handled as a miss in accordance with step 460.

If the initial ray missed the mesh but hits a voxel location in the voxel grid 230, in step 460, particular embodiments may determine the location of the closest (with respect to the voxel) corresponding location(s) in lit mesh 220 that registered a hit, and one or more second rays 230 may be traced from the voxel location to the corresponding location(s) in order to sample color at the location(s).

In step 465, the sampled colors are combined to obtain a single color for volumetric projection from the sampled locations outwards through the mesh. In particular embodiments, combining the sampled colors may comprise averaging the sampled colors. In particular embodiments, the sampling pattern may specify sampling weights for different locations in the lit mesh.

In step 470, for each sampled location in the mesh, the corresponding color for the volumetric projection is blurred outward from the sampled location in the mesh outward through the voxel grid. In particular embodiments, the direction of blurring through the voxel grid may be toward the viewpoint; in particular embodiments, the direction of blurring through the voxel grid may radiate orthogonally away from a perimeter of the lit mesh.

Finally, in step 480, the fully-colored voxel grid is integrated into the scene. In particular embodiments, the voxel grid may be rendered and composited with a fully-rendered version of the scene (including a visible rendering of the object for which the volumetric projection was generated). The default opacity of each voxel in the voxel grid may be configured to have a level of transparency that enables the underlying character to be visible when composited with the volumetric projection. In such embodiments, certain areas of the voxel grid may be completely culled away such that there are portions of the lit mesh that are not overlaid by any voxels (e.g., in areas where the character should be clearly visible without any blurring or color smearing).

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
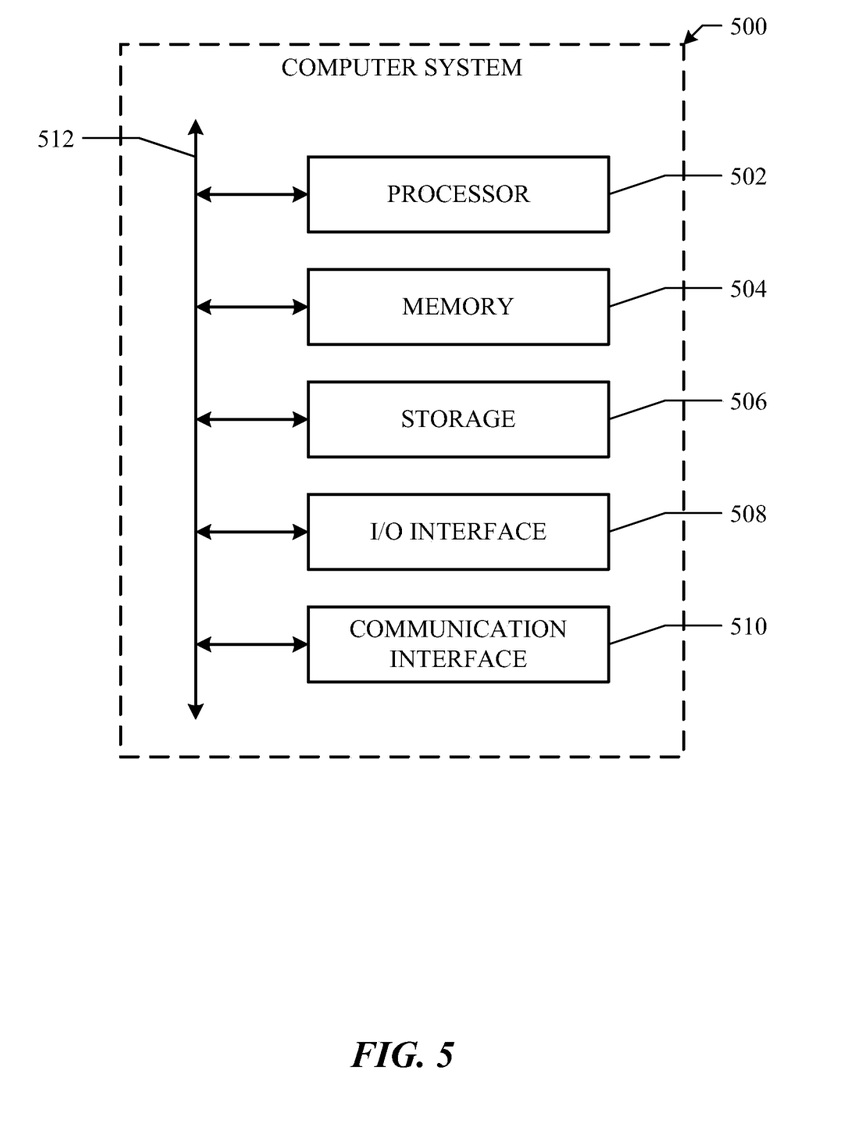
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
providing a mesh for an object in a scene, wherein the mesh describes a surface geometry of the object, and wherein the scene is defined with respect to a viewpoint;
generating a voxel grid comprising volumetric masks for the mesh;
generating a lit mesh, wherein the lit mesh comprises a shaded version of the mesh as positioned in the scene, and wherein the voxel grid and the lit mesh are separately generated;
positioning the voxel grid over the lit mesh in the scene, wherein the voxel grid is positioned between the viewpoint and the lit mesh;
tracing a first ray from the viewpoint through a position on the voxel grid;
tracing a plurality of second rays from the position on the voxel grid to a plurality of locations on the lit mesh, wherein each of the locations on the lit mesh is proximate to the position on the voxel grid; and
blurring color sampled at the plurality of locations on the lit mesh outward through the position on the voxel grid to create a volumetric projection.

2. The method of claim 1, further comprising:
culling one or more portions of the voxel grid to spatially reduce the volumetric projection with respect to those portions.

3. The method of claim 1, further comprising:
rendering the lit mesh as invisible.

4. The method of claim 1, further comprising:
calculating viewpoint location and direction with respect to the scene.

5. The method of claim 1, further comprising:
determining a sampling pattern based on targeted areas for the volumetric projection, wherein the sampling pattern specifies an extent of color sampling with respect to different locations, and wherein the tracing the first ray is performed based on the sampling pattern.

6. The method of claim 1, further comprising:
determining that the traced ray passed through the voxel grid and hit a location on the lit mesh, wherein each of the sampled locations on the lit mesh is adjacent to the location on the lit mesh hit by the traced ray.

7. The method of claim 1, further comprising:
determining that the traced ray hit a location in the voxel grid but did not hit a location on the lit mesh; and
tracing one or more second rays from the location in the voxel grid to the sampled locations, wherein the sampled locations comprise a closest location on the lit mesh with respect to the hit location in the voxel grid.

8. One or more computer-readable non-transitory storage media embodying software operable when executed by one or more processors to:
provide a mesh for an object in a scene, wherein the mesh describes a surface geometry of the object, and wherein the scene is defined with respect to a viewpoint;
generate a voxel grid comprising volumetric masks for the mesh;
generate a lit mesh, wherein the lit mesh comprises a shaded version of the mesh as positioned in the scene, and wherein the voxel grid and the lit mesh are separately generated;
position the voxel grid over the lit mesh in the scene, wherein the voxel grid is positioned between the viewpoint and the lit mesh;
trace a first ray from the viewpoint through a position on the voxel grid;
trace a plurality of second rays from the position on the voxel grid to a plurality of locations on the lit mesh, wherein each of the locations on the lit mesh is proximate to the position on the voxel grid; and
blur color sampled at the plurality of locations on the lit mesh outward through the position on the voxel grid to create a volumetric projection.

9. The media of claim 8, further comprising software operable when executed by one or more processors to:
cull one or more portions of the voxel grid to spatially reduce the volumetric projection with respect to those portions.

10. The media of claim 8, further comprising software operable when executed by one or more processors to:
render the lit mesh as invisible.

11. The media of claim 8, further comprising software operable when executed by one or more processors to:
calculate viewpoint location and direction with respect to the scene.

12. The media of claim 8, further comprising software operable when executed by one or more processors to:
determine a sampling pattern based on targeted areas for the volumetric projection, wherein the sampling pattern specifies an extent of color sampling with respect to different locations, and wherein the tracing the first ray is performed based on the sampling pattern.

13. The media of claim 8, further comprising software operable when executed by one or more processors to:
determine that the traced ray passed through the voxel grid and hit a location on the lit mesh, wherein each of the sampled locations on the lit mesh is adjacent to the location on the lit mesh hit by the traced ray.

14. The media of claim 8, further comprising software operable when executed by one or more processors to:
determine that the traced ray hit a location in the voxel grid but did not hit a location on the lit mesh; and
trace one or more second rays from the location in the voxel grid to the sampled locations, wherein the sampled locations comprise a closest location on the lit mesh with respect to the hit location in the voxel grid.

15. A system comprising:
one or more processors; and
a memory coupled to the processors comprising instructions executable by the processors, the processors being operable when executing the instructions to:
provide a mesh for an object in a scene, wherein the mesh describes a surface geometry of the object, and wherein the scene is defined with respect to a viewpoint;
generate a voxel grid comprising volumetric masks for the mesh;
generate a lit mesh, wherein the lit mesh comprises a shaded version of the mesh as positioned in the scene, and wherein the voxel grid and the lit mesh are separately generated;
position the voxel grid over the lit mesh in the scene, wherein the voxel grid is positioned between the viewpoint and the lit mesh;
trace a first ray from the viewpoint through a position on the voxel grid;
trace a plurality of second rays from the position on the voxel grid to a plurality of locations on the lit mesh, wherein each of the locations on the lit mesh is proximate to the position on the voxel grid; and blur color sampled at the plurality of locations on the lit mesh outward through the position on the voxel grid to create a volumetric projection.

16. The system of claim 15, the processors being further operable when executing the instructions to:

cull one or more portions of the voxel grid to spatially reduce the volumetric projection with respect to those portions.

17. The system of claim 15, the processors being further operable when executing the instructions to:

render the lit mesh as invisible.

18. The system of claim 15, the processors being further operable when executing the instructions to:

determine a sampling pattern based on targeted areas for the volumetric projection, wherein the sampling pattern specifies an extent of color sampling with respect to different locations, and wherein the tracing the first ray is performed based on the sampling pattern.

19. The system of claim 15, the processors being further operable when executing the instructions to:

determine that the traced ray passed through the voxel grid and hit a location on the lit mesh, wherein each of the sampled locations on the lit mesh is adjacent to the location on the lit mesh hit by the traced ray.

20. The system of claim 15, the processors being further operable when executing the instructions to:

determine that the traced ray hit a location in the voxel grid but did not hit a location on the lit mesh; and trace one or more second rays from the location in the voxel grid to the sampled locations, wherein the sampled locations comprise a closest location on the lit mesh with respect to the hit location in the voxel grid.

* * * * *